(12) United States Patent
Tomitaka (10) Patent No.: US 6,952,274 B2
(45) Date of Patent: Oct. 4, 2005

(54) DOUBLE-SIDED PRINTING SYSTEM, RECORDING MEDIUM ON WHICH A PROGRAM FOR THE SYSTEM IS RECORDED, AND DISTRIBUTION METHOD FOR PRINTED MATTER PRINTED MAKING USE OF THE SYSTEM

(75) Inventor: Ken-ichiro Tomitaka, Tokyo (JP)

(73) Assignee: NEC Corporation (JP)

( * ) Notice: Subject to any disclaimer, the term of this patent is extended or adjusted under 35 U.S.C. 154(b) by 913 days.

(21) Appl. No.: 09/798,418

(22) Filed: Mar. 2, 2001

(65) Prior Publication Data

US 2001/0019419 A1 Sep. 6, 2001

(30) Foreign Application Priority Data

Mar. 3, 2000 (JP) ........................................ 2000-063348

(51) Int. Cl.$^7$ ............................ G06K 15/02; G06F 3/12
(52) U.S. Cl. ........................ 358/1.1; 358/1.13; 358/1.9
(58) Field of Search ................................ 358/1.1–1.18

(56) References Cited

U.S. PATENT DOCUMENTS 6,738,156 B1 * 5/2004 Simpson et al. ........... 358/1.15

FOREIGN PATENT DOCUMENTS

| JP | 7-78143 | 3/1995 |
|---|---|---|
| JP | 10-27076 | 1/1998 |
| JP | 11-129556 | 5/1999 |
| JP | 11-179993 | 7/1999 |
| JP | 11-232001 | 8/1999 |
| JP | 2000-35861 | 2/2000 |

OTHER PUBLICATIONS

Japanese Office Action dated Apr. 1, 2003 (w/ English translation of relevant portion).
Japanese Office Action dated Aug. 6, 2002 (w/ English translation of relevant portion).

* cited by examiner

*Primary Examiner*—Douglas Tran
(74) *Attorney, Agent, or Firm*—Dickstein, Shapiro, Morin & Oshinsky, LLP.

(57) ABSTRACT

A double-sided printing system is disclosed which can effect double-sided printing of an arbitrary combination of a plurality of documents prepared by a plurality of different applications. A double-sided printing management section of a host computer stores "double-sided printing setting information" (pages to be printed, a printing order, a form of double-sided printing, a paper size for printing and so forth) and instructs a printing job processing section to perform printing data processing so that data may be processed in accordance with the setting information by the printing job processing section. The printing job processing section processes data in accordance with the information received from the double-sided printing management section to synthesize the data into printing data for designated double-sided printing and transmits the synthesized printing data to a printer through a data transfer section. The printer prints the printing data received from the host computer.

18 Claims, 5 Drawing Sheets

| ORDER OF PAGES AFTER PRINTED | DOCUMENT TO BE PRINTED (PAGE NUMBER) |
|---|---|
| 1 | App1.doc-Page1 |
| 2 | App2.grp-Page1 |
| 3 | App1.doc-Page2 |
| 4 | App2.grp-Page2 |
| 5 | App1.doc-Page3 |
| 6 | App2.grp-Page3 |

DOUBLE-SIDED PRINTING FORM
● HORIZONTAL OPENING (THIS IS SELECTED)
○ VERTICAL OPENING

| ORDER OF PAGES AFTER PRINTED | DOCUMENT TO BE PRINTED (PAGE NUMBER) |
|---|---|
| 1 | 1 | ← App1.doc-Page1
| 2 | 2 | ← App1.doc-Page2
| 3 | 3 | ← App1.doc-Page3
| 4 | 4 | ← App2.grp-Page1
| 5 | 5 | ← App2.grp-Page2
| 6 | 6 | ← App2.grp-Page3

FIG. 4

| ORDER OF PAGES AFTER PRINTED | DOCUMENT TO BE PRINTED (PAGE NUMBER) |
|---|---|
| 1 | App1.doc-Page1 |
| 2 | App2.grp-Page1 |
| 3 | App1.doc-Page2 |
| 4 | App2.grp-Page2 |
| 5 | App1.doc-Page3 |
| 6 | App2.grp-Page3 |

DOUBLE-SIDED PRINTING FORM
● HORIZONTAL OPENING
(THIS IS SELECTED)
○ VERTICAL OPENING

FIG. 5

DOUBLE-SIDED PRINTING SYSTEM, RECORDING MEDIUM ON WHICH A PROGRAM FOR THE SYSTEM IS RECORDED, AND DISTRIBUTION METHOD FOR PRINTED MATTER PRINTED MAKING USE OF THE SYSTEM

BACKGROUND OF THE INVENTION

1. Field of the Invention

The present invention relates to a double-sided printing system, a program recording medium for a double-sided printing system and a method of distributing a printed matter printed making use of a double-sided printing system, and more particularly to a double-sided printing system which can combine a plurality of documents arbitrarily prepared using different applications to effect double-sided printing, and a recording medium on which a program for a double-sided printing system of the type mentioned is recorded as well as a method of distributing printed matters printed making use of the double-sided printing system.

2. Description of the Related Art

Conventionally, in order to produce a material composed of paper sheets printed on both sides or faces thereof from a document prepared by a predetermined application, either all pages of the document are printed by single-sided printing first and then a copying machine is used to effect double-sided printing using the single-sided printed pages or one side or face of each paper sheet is first printed taking its page layout into consideration and then the reverse side or face of each sheet is printed to achieve double-sided printing.

However, such editing operation is performed manually and is cumbersome. Thus, a double-sided printing system which is improved in this regard is disclosed in Japanese Patent Laid-Open No. 129566/1999. In the double-sided printing system, data of odd-numbered pages of different document files are printed such that the last page of a preceding file and the top page of a following file are outputted to the same paper sheet by invalidating an output of an initialization command to be inserted between document files or stopping outputting of such an initialization command.

The double-sided printing system of the document mentioned above, however, is used to edit data so that the date may form a document of a single application. In this instance, the double-sided printing function is effective only with a document prepared by a single kind of application. Thus, the double-sided printing system is disadvantageous in that it cannot effect double-sided printing of a combination of documents prepared by a plurality of applications.

SUMMARY OF THE INVENTION

It is an object of the present invention to provide a double-sided printing system which can effect double-sided printing of an arbitrary combination of a plurality of documents prepared by a plurality of different applications, a program recording medium for the double-sided printing system and a distribution method of printed matters printed making use of the double-sided printing system.

In order to attain the object described above, according to an aspect of the present invention, there is provided a double-sided printing system for printing a plurality of document files prepared by a plurality of different applications on both faces of printing paper, comprising a computer, and a printing apparatus connected to the computer for receiving a plurality of document files prepared by a plurality of different applications from the computer, the computer including double-sided printing management means for managing printing information for causing the document files prepared by the different applications to be printed on both faces of the printing paper, printing job processing means for processing data of the document files based on the printing information of the double-sided printing management means, data storage means for temporarily storing the data of the document files processed by the printing job processing means, and data transfer means for transferring the data processed by the printing job processing means to the printing apparatus.

Preferably, the printing information includes information of the document files to be printed, pages to be printed, an order in which the pages are to be printed, a size of the print paper and a double-sided printing form.

Preferably, the printing job processing means synthesizes the data of the document files stored in the data storage means and transmits the synthesized data to the printing means through the data transfer means.

According to another aspect of the present invention, there is provided a double-sided printing system for printing a plurality of document files prepared by a plurality of different applications on both faces of printing paper, comprising a computer, and a printing apparatus connected to the computer for receiving a plurality of document files prepared by a plurality of different applications from the computer, the computer including double-sided printing management means for managing printing information for causing the document files prepared by the different applications to be printed on both faces of the printing paper, printing job processing means for processing data of the document files based on the printing information of the double-sided printing management means, and first data transfer means for transferring the data processed by the printing job processing means to the printing apparatus, the printing apparatus including second data transfer means for receiving the data transferred thereto from the first data transfer means, data management means for managing the data of the document files received through the second data transfer means, data storage means for temporarily storing the data of the document files managed by the data management means, and printing means for printing the data of the document files managed by the data management means based on the print information.

Preferably, the printing information includes information of the document files to be printed, pages to be printed, an order in which the pages are to be printed, a size of the print paper and a double-sided printing form.

Preferably, the data management means synthesizes the data of the document files stored in the data storage means and transmits the synthesized data to the printing means.

According to a further aspect of the present invention, there is provided a recording medium on which a program for implementing a double-sided printing system which includes a computer and a printing apparatus connected to the computer for receiving a plurality of document files prepared by a plurality of different applications and printing the document files on both faces of printing paper is recorded, the program causing the double-sided printing system to implement functions of double-sided printing management means for managing printing information for causing the document files prepared by the different applications to be printed on both faces of the printing paper, printing job processing means for processing data of the document files based on the printing information of the double-sided printing management means, data storage means for temporarily storing the data of the document files processed by the printing job processing means, and data transfer means for transferring the data processed by the printing job processing means to the printing apparatus.

Preferably, the printing information includes information of the document files to be printed, pages to be printed, an order in which the pages are to be printed, a size of the print paper and a double-sided printing form.

Preferably, the printing job processing means synthesizes the data of the document files stored in the data storage means and transmits the synthesized data to the printing means through the data transfer means.

According to a still further aspect of the present invention, there is provided a recording medium on which a program for implementing a double-sided printing system which includes a computer and a printing apparatus connected to the computer for receiving a plurality of document files prepared by a plurality of different applications and printing the document files on both faces of printing paper is recorded, the program causing the double-sided printing system to implement functions of double-sided printing management means of the computer for managing printing information for causing the document files prepared by the different applications to be printed on both faces of the printing paper, printing job processing means of the computer for processing data of the document files based on the printing information of the double-sided printing management means, first data transfer means of the computer for transferring the data processed by the printing job processing means to the printing apparatus, second data transfer means of the printing apparatus for receiving the data transferred thereto from the first data transfer means, data management means of the printing apparatus for managing the data of the document files received through the second data transfer means, data storage means of the printing apparatus for temporarily storing the data of the document files managed by the data management means, and printing means of the printing apparatus for printing the data of the document files managed by the data management means based on the print information.

Preferably, the printing information includes information of the document files to be printed, pages to be printed, an order in which the pages are to be printed, a size of the print paper and a double-sided printing form.

Preferably, the data management means synthesizes the data of the document files stored in the data storage means and transmits the synthesized data to the printing means.

According to a yet further aspect of the present invention, there is provided a method of distributing a printed matter printed making use of a double-sided printing system which includes a computer and a printing apparatus connected to the computer for receiving a plurality of document files prepared by a plurality of different applications and printing the document files on both faces of printing paper, the method comprising the step of distributing, as a material, a catalogue, a pamphlet or the like, the printed matter printed on both faces thereof by a process including a double-sided printing management step of managing printing information for causing the document files prepared by the different applications to be printed on both faces of the printing paper, a printing job processing step of processing data of the document files based on the printing information of the double-sided printing management step, a data storage step of temporarily storing the data of the document files processed by the printing job processing step, and a data transfer step of transferring the data processed by the printing job processing step to the printing apparatus.

Preferably, the printing information includes information of the document files to be printed, pages to be printed, an order in which the pages are to be printed, a size of the print paper and a double-sided printing form.

Preferably, the printing job processing step synthesizes the data of the document files stored by the data storage step and transmits the synthesized data to the printing step through the data transfer step.

According to a yet further aspect of the present invention, there is provided a method of distributing a printed matter printed making use of a double-sided printing system which includes a computer and a printing apparatus connected to the computer for receiving a plurality of document files prepared by a plurality of different applications and printing the document files on both faces of printing paper, the method comprising the step of distributing, as a material, a catalogue, a pamphlet or the like, the printed matter printed on both faces thereof by a process including a double-sided printing management step by the computer of managing printing information for causing the document files prepared by the different applications to be printed on both faces of the printing paper, a printing job processing step by the computer of processing data of the document files based on the printing information of the double-sided printing management step, a first data transfer step by the computer of transferring the data processed by the printing job processing step to the printing apparatus, a second data transfer step by the printing apparatus of receiving the data transferred thereto from the first data transfer step, a data management step by the printing apparatus of managing the data of the document files received through the second data transfer step, a data storage step by the printing apparatus of temporarily storing the data of the document files managed by the data management step, and a printing step by the printing apparatus of printing the data of the document files managed by the data management step based on the print information.

Preferably, the printing information includes information of the document files to be printed, pages to be printed, an order in which the pages are to be printed, a size of the print paper and a double-sided printing form.

Preferably, the data management step synthesizes the data of the document files stored by the data storage step and transmits the synthesized data to the printing step.

With the double-sided printing systems, the program recording media for a double-sided printing system and the methods of distributing a printed matter printed using a double-sided printing system, when a material formed from paper printed on both faces or sides thereof is to be prepared from a plurality of documents produced by a plurality of different applications, double-sided printing of data of the different applications can be realized only through setting of a printer driver.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

<First Embodiment>

Figure 1:
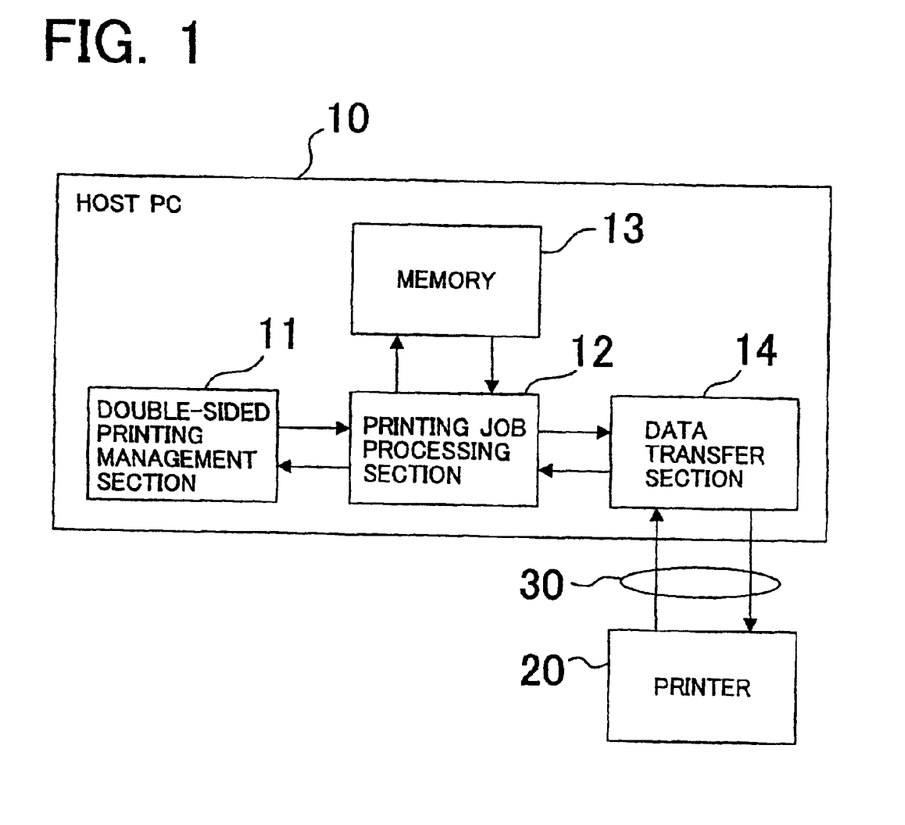
FIG. 1 is a block diagram showing a construction of a double-sided printing system to which the present invention is applied.

Referring first to FIG. 1, there is shown a construction of a double-sided printing system to which the present invention is applied.

The double-sided printing system shown includes a host computer (PC) 10 and a printer 20. The host computer 10 includes a double-sided printing management section 11, a printing job processing section 12, a memory 13, and a data transfer section 14.

The host computer 10 and the printer 20 are connected to each other by a printer cable 30. The host computer 10 transmits printing data (a printing job) of a document prepared by an operator to the printer 20 over the printer cable 30 so that the printing data may be printed by the printer 20.

The double-sided printing management section 11 stores "double-sided printing setting information" (pages to be printed, a printing order, a form of double-sided printing, a paper size for printing and so forth) and instructs the printing job processing section 12 to perform printing data processing so that data may be processed in accordance with the setting information by the printing job processing section 12.

The printing job processing section 12 processes data in accordance with the information received from the double-sided printing management section 11 to synthesize the data into printing data for designated double-sided printing and transmits the synthesized printing data to the printer 20 through the data transfer section 14.

The memory 13 temporarily stores printing data processed by the printing job processing section 12. The data transfer section 14 transmits and receives printing data, status data or other necessary data to and from the printer 20. The printer 20 prints printing data received from the host computer 10.

In the following, double-sided printing operation of the double-sided printing system is described with reference to a flow chart of FIG. 2.

As an example, operation when two files "App1.doc" and "App2.grp" prepared by two different applications are printed by double-sided printing compositely and alternately 3 by 3 pages of the A4 size in a horizontally opening form until a printing command is executed is described.

First, it is discriminated in step S21 whether or not the double-sided printing function by a plurality of applications is selected. If the double-sided printing function by a plurality of applications is not selected and consequently the discrimination in step S21 is NO, then printing processing similar to that executed by a conventional printer is performed in step S22. On the other hand, if the double-sided printing function by a plurality of applications is selected and consequently the discrimination in step S21 is YES, then it is discriminated in step S23 whether or not "double-sided printing setting information" (pages to be printed, a printing order, a form of double-sided printing, a paper size for printing and so forth) is set correctly.

Setting of information necessary for double-sided printing by a plurality of applications is performed, for example, in accordance with the following method.

An operator will open a printer driver for the printer 20, select "double-sided printing setting information" {files to be printed, pages to be printed, an order in which the pages are to be printed, a paper size for printing, a form (a vertically opening form or a horizontally opening form) and so forth}, and stores the setting.

Figure 3:
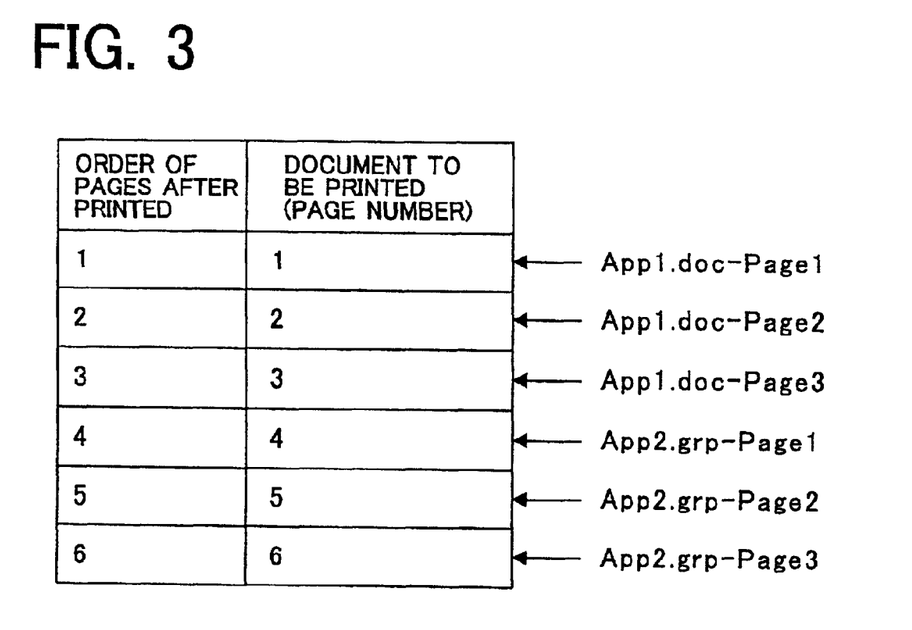
FIG. 3 is a view illustrating files and pages of an object of double-sided printing and an example of a page order setting method after printed.

If the operator selects documents to be printed, then page numbers of the documents to be printed are displayed as seen in FIG. 3. In what order the documents are printed is set by inserting information of a document name and a page number into each box of the "Document to Be Printed (Page Number)".

Figure 4:
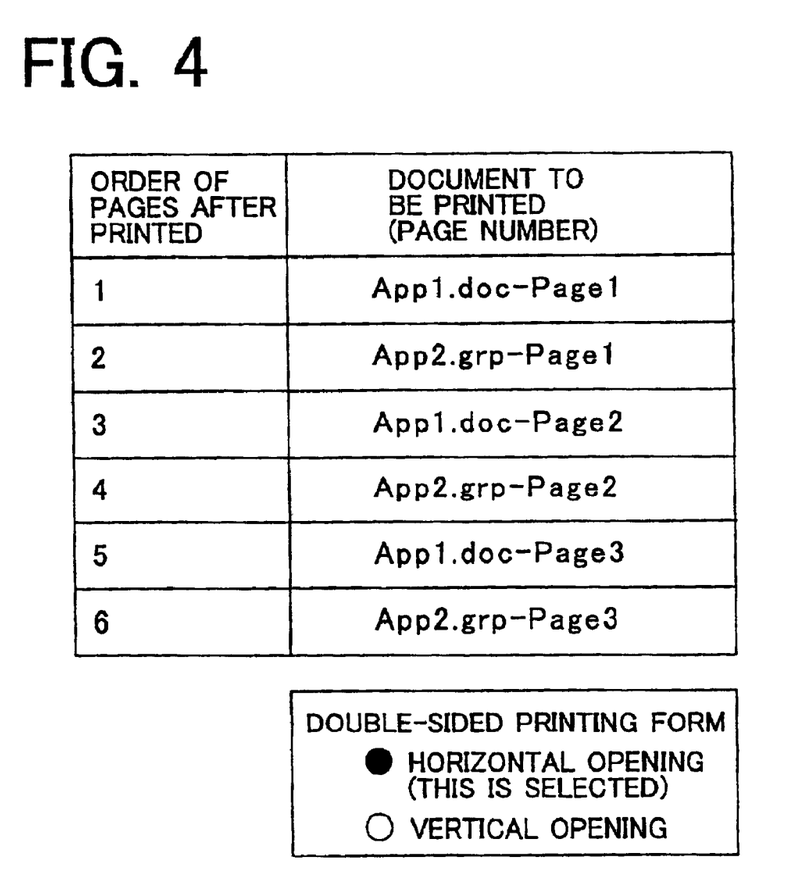
FIG. 4 is a view illustrating an example of files and pages of double-sided printing, an order of pages after printed and setting of a double-sided printing form.

In the present embodiment, for example, the order in which the documents are to be printed is set in such a manner as seen in FIG. 4, and the "horizontally opening" of the double-sided printing form is selected. Further, the paper size for printing is set, for example, to A4.

If the "double-sided printing setting information" above is set correctly and consequently the discrimination in step S23 is YES, then the double-sided printing management section 11 stores, in step S25, the "double-sided printing setting information" set by the operator. On the contrary if the double-sided printing setting information" described above is not set correctly and consequently the discrimination in step S23 is NO, then the double-sided printing management section 11 causes, in step S24, a message to be displayed on a screen of the host computer 10 to urge the operator to set the double-sided printing setting items correctly.

After the "double-sided printing setting information" is stored, the double-sided printing management section 11 causes, in step S26, a message to be displayed on the screen of the host computer 10 to urge the operator to execute a printing command of the file "App1.doc".

Then in step S27, the double-sided printing management section 11 discriminates whether or not the operator executes the printing command of the file "App1.doc". If the printing command is not executed and consequently the discrimination in step S27 is NO, then the operation in step S27 is repeated. However, if the printing command is executed and consequently the discrimination in step S27 is YES, then the double-sided printing management section 11 causes, in step S28, a message to be displayed on the screen (not shown) of the host computer 10 to urge the operator to execute a printing command of the file "App2.grp". It is to be noted, however, that the double-sided printing management section 11 stands by without executing the printing command of the file "App1.doc" immediately.

Then in step S29, the double-sided printing management section 11 discriminates whether or not the operator executes the printing command of the file "App2.grp". If the printing command is not executed and consequently the discrimination in step S29 is NO, then the operation in step S29 is executed. However, if the printing command is executed and consequently the discrimination in step S29 is YES, then the double-sided printing management section 11 changes, in accordance with the "double-sided printing setting information" set by the operator, the printing command of the file "App1.doc" and the printing command of the file "App2.grp", which are in a pending state, to a command for printing only the set pages in the set printing order one by one page, and transmits the changed command to the printing job processing section 12 together with an instruction to perform double-sided printing in a horizontally opening form with the A4 size. Thereafter, the printing command is executed.

When the printing command is executed, the printing job processing section 12 performs printing processing in accordance with the printing order indicated by the double-sided printing management section 11. After the printing processing for the first page is completed, the printing job processing section 12 stores printing data into the memory 13 and performs printing processing for the second page.

After the data processing for the first and second pages is completed, the printing job processing section 12 synthesizes the printing data stored in the memory 13 in accordance with the printing information (double-sided printing in a horizontally opening form with the A4 size) conveyed from the double-sided printing management section 11 and transmits the synthesized printing data to the printer 20 through the data transfer section 14 so that double-sided printing may be performed with the synthesized printing data.

In the present embodiment, the printer driver (program) is recorded on and provided as a medium to the operator. The printer driver (program) allows such control as described above as the operation of the double-sided printing management section 11 and the printing job processing section 12, and the host computer 10 (hardware) controlled by the printer driver (program) performs the specific processing of synthesizing a plurality of documents prepared by different applications to produce printing data for double-sided printing.

It is to be noted that, while, in the present embodiment, the host computer 10 and the printer 20 are connected directly to each other by a printer cable, they may alternatively be connected to each other through a print server so that printing data may be transmitted through the print server and printed by the printer 20.

<Second Embodiment>

Figure 5:
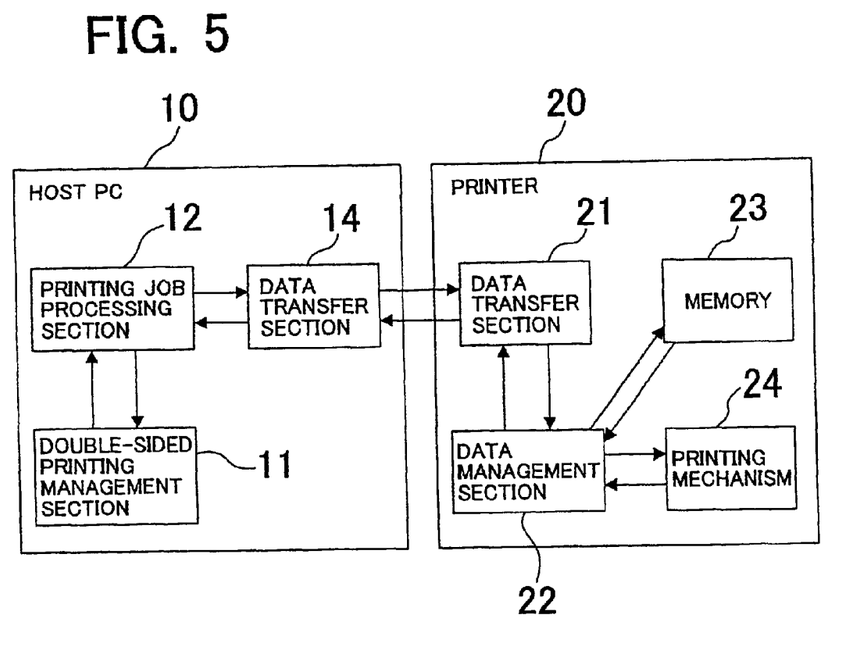
FIG. 5 is a block diagram showing a construction of another double-sided printing system to which the present invention is applied.

FIG. 5 shows a construction of another double-sided printing system to which the present invention is applied.

Referring to FIG. 5, the double-sided printing system shown includes a host computer 10 and a printer 20 similarly to the double-sided printing system of the first embodiment described hereinabove. However, the double-sided printing system of the present embodiment is different from the double-sided printing system of the first embodiment in that the host computer 10 includes a double-sided printing management section 11, a printing job processing section 12, and a data transfer section 14 which are all similar to those in the double-sided printing system of the first embodiment, and the printer 20 includes a data transfer section 21, a data management section 22, a memory 23, and a printing mechanism 24.

While, in the double-sided printing system of the first embodiment, the host computer 10 synthesizes a plurality of printing data by different applications into printing data for double-sided printing, in the double-sided printing system of the present embodiment, a plurality of printing data by different applications are synthesized into printing data for double-sided printing by the printer 20.

In particular, the data management section 22 of the printer 20 receives information such as a double-sided printing form, a paper size for printing and so forth and printing data from the host computer 10, synthesizes the printing data into printing data for double-sided printing in accordance with the information and sends the printing data for double-sided printing to the printing mechanism 24. The printing mechanism 24 executes a printing operation of the printing data received from the data management section 22.

Figure 2:
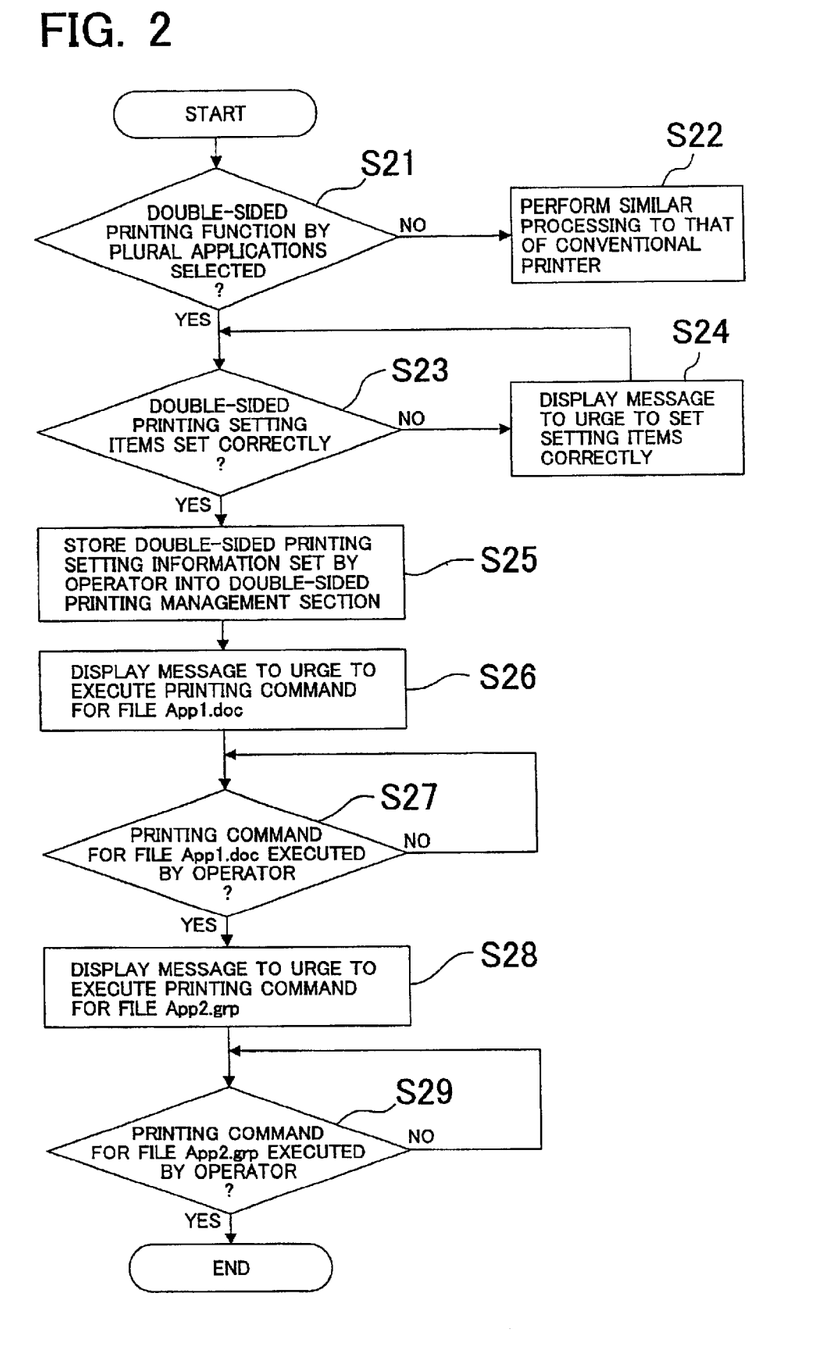
FIG. 2 is a flow chart illustrating a double-sided printing process of the double-sided printing system shown in FIG. 1.

Operation of the double-sided printing system of the present embodiment before a printing command is executed is similar to the operation of the double-sided printing system of the first embodiment before the printing command is executed (the operations in steps S21 to S29 of FIG. 2). The double-sided printing system of the present embodiment, however, performs the following operation next to the operation in step S29 of FIG. 2.

In particular, the printing job processing section 12 performs printing processing in accordance with the printing order conveyed from the double-sided printing management section 11. Thus, after printing processing for the first page is completed, the printing job processing section 12 transmits an instruction to perform double-sided printing in a horizontally opening form with the A4 size together with printing data for the first page obtained by the printing processing to the data management section 22 of the printer 20 through the data transfer section 14 and the data transfer section 21.

The data management section 22 of the printer 20 stores the printing data for the first page received from the printing job processing section 12 of the host computer 10 into the memory 23 and waits for printing data for the second page. The printing job processing section 12 of the host computer 10 performs data processing for the second page after it transmits the printing data for the first page to the data management section 22 of the printer 20.

Then, after reception of the printing data for the first and second pages is completed, the data management section 22 of the printer 20 synthesizes the printing data stored in the memory 23 in accordance with the print information (double-sided printing in a horizontally opening form with the A4 size) received from the printing job processing section 12 of the host computer 10, and transmits the synthesized printing data to the printing mechanism 24 so that double-sided printing of the synthesized printing data may be performed by the printing mechanism 24. Double-sided printing of the remaining pages is performed in a similar manner.

Printed matters which are printed on both sides or faces making use of the double-sided printing system of the first or second embodiment described above are distributed as materials, catalogues, pamphlets or the like.

While preferred embodiments of the present invention have been described using specific terms, such description is for illustrative purposes only, and it is to be understood that changes and variations may be made without departing from the spirit or scope of the following claims.

What is claimed is:

1. A double-sided printing system for printing from a plurality of document files prepared by a plurality of different applications on both faces of printing paper, comprising:
   a computer; and
   a printing apparatus connected to said computer for receiving selected portions of said plurality of document files prepared by a plurality of different applications from said computer;
   said computer including
      double-sided printing management means for receiving printer information from a user for causing said selected portions of said document files prepared by the different applications to be printed on both faces of the printing paper, the printer information including names of the plurality of document files, page numbers for said selected portions and an order in which the pages are to be printed, printing job processing means for processing data of the document files based on the printing information of said double-sided printing management means, data storage means for temporarily storing the data of the document files processed by said printing job processing means, and data transfer means for transferring the data processed by said printing job processing means to said printing apparatus.

2. A double-sided printing system as claimed in claim 1, wherein the printing information further includes a size of the print paper and a double-sided printing form.

3. A double-sided printing system as claimed in claim 1, wherein said printing job processing means synthesizes the data of the document files stored in said data storage means and transmits the synthesized data to said printing means through said data transfer means.

4. A double-sided printing system for printing from a plurality of document files prepared by a plurality of different applications on both faces of printing paper, comprising:

a computer; and a printing apparatus connected to said computer for receiving selected portions of said plurality of document files prepared by a plurality of different applications from said computer;

said computer including double-sided printing management means for receiving printing information from a user for causing said selected portions of said document files prepared by the different applications to be printed on both faces of the printing paper, the printer information including names of the plurality of document files, page numbers for said selected portions and an order in which the pages are to be printed, printing job processing means for processing data of the document files based on the printing information of said double-sided printing management means, and first data transfer means for transferring the data processed by said printing job processing means to said printing apparatus;

said printing apparatus including second data transfer means for receiving the data transferred thereto from said first data transfer means, data management means for managing the data of the document files received through said second data transfer means, data storage means for temporarily storing the data of the document files managed by said data management means, and printing means for printing the data of the document files managed by said data management means based on the print information.

5. A double-sided printing system as claimed in claim 4, wherein the printing information further includes a size of the print paper and a double-sided printing form.

6. A double-sided printing system as claimed in claim 4, wherein said data management means synthesizes the data of the document files stored in said data storage means and transmits the synthesized data to said printing means.

7. A recording medium on which a program for implementing a double-sided printing system which includes a computer and a printing apparatus connected to said computer for receiving selected portions of a plurality of document files prepared by a plurality of different applications and printing from the document files on both faces of printing paper is recorded, the program causing said double-sided printing system to implement functions of:

double-sided printing management means for receiving printing information from a user for causing said selected portions of said document files prepared by the different applications to be printed on both faces of the printing paper, the printer information including names of the plurality of document files, page numbers for said selected portions and an order in which the pages are to be printed;

printing job processing means for processing data of the document files based on the printing information of said double-sided printing management means;

data storage means for temporarily storing the data of the document files processed by said printing job processing means; and data transfer means for transferring the data processed by said printing job processing means to said printing apparatus.

8. A recording medium as claimed in claim 7, wherein the printing information further includes a size of the print paper and a double-sided printing form.

9. A recording medium as claimed in claim 7, wherein said printing job processing means synthesizes the data of the document files stored in said data storage means and transmits the synthesized data to said printing means through said data transfer means.

10. A recording medium on which a program for implementing a double-sided printing system which includes a computer and a printing apparatus connected to said computer for receiving selected portions of a plurality of document files prepared by a plurality of different applications and printing from the document files on both faces of printing paper is recorded, the program causing said double-sided printing system to implement functions of:

double-sided printing management means of said computer for receiving printing information from a user for causing said selected portions of said document files prepared by the different applications to be printed on both faces of the printing paper, the printer information including names of the plurality of document files, page numbers for said selected portions and an order in which the pages are to be printed;

printing job processing means of said computer for processing data of the document files based on the printing information of said double-sided printing management means;

first data transfer means of said computer for transferring the data processed by said printing job processing means to said printing apparatus;

second data transfer means of said printing apparatus for receiving the data transferred thereto from said first data transfer means;

data management means of said printing apparatus for managing the data of the document files received through said second data transfer means;

data storage means of said printing apparatus for temporarily storing the data of the document files managed by said data management means; and printing means of said printing apparatus for printing the data of the document files managed by said data management means based on the print information.

11. A printing medium as claimed in claim 10, wherein the printing information further includes a size of the print paper and a double-sided printing form.

12. A printing medium as claimed in claim 10, wherein said data management means synthesizes the data of the document files stored in said data storage means and transmits the synthesized data to said printing means.

13. A method of distributing a printed matter printed making use of a double-sided printing system which includes a computer and a printing apparatus connected to said computer for receiving selected portions of a plurality of document files prepared by a plurality of different applications and printing from the document files on both faces of printing paper, the method comprising the step of distributing, as a material, a catalogue, a pamphlet or the like, the printed matter printed on both faces thereof by a process including:

a double-sided printing management step of receiving printing information from a user for causing said selected portions of said document files prepared by the different applications to be printed on both faces of the printing paper, the printer information including names of the plurality of document files, page numbers for said selected portions and an order in which the pages are to be printed;

a printing job processing step of processing data of the document files based on the printing information of the double-sided printing management step;

a data storage step of temporarily storing the data of the document files processed by the printing job processing step; and a data transfer step of transferring the data processed by the printing job processing step to said printing apparatus.

14. A method of distributing a printed matter printed making use of a double-sided printing system as claimed in claim 13, wherein the printing information further includes a size of the print paper and a double-sided printing form.

15. A method of distributing a printed matter printed making use of a double-sided printing system as claimed in claim 13, wherein the printing job processing step synthesizes the data of the document files stored by the data storage step and transmits the synthesized data to the printing step through the data transfer step.

16. A method of distributing a printed matter printed making use of a double-sided printing system which includes a computer and a printing apparatus connected to said computer for receiving selected portions of a plurality of document files prepared by a plurality of different applications and printing from the document files on both faces of printing paper, the method comprising the step of distributing, as a material, a catalogue, a pamphlet or the like, the printed matter printed on both faces thereof by a process including:

a double-sided printing management step by said computer of receiving printing information from a user for causing said selected portions of said document files prepared by the different applications to be printed on both faces of the printing paper, the printer information including names of the plurality of document files, page numbers for said selected portions and an order in which the pages are to be printed;

a printing job processing step by said computer of processing data of the document files based on the printing information of the double-sided printing management step;

a first data transfer step by said computer of transferring the data processed by the printing job processing step to said printing apparatus;

a second data transfer step by said printing apparatus of receiving the data transferred thereto from the first data transfer step;

a data management step by said printing apparatus of managing the data of the document files received through the second data transfer step;

a data storage step by said printing apparatus of temporarily storing the data of the document files managed by the data management step; and a printing step by said printing apparatus of printing the data of the document files managed by the data management step based on the print information.

17. A method of distributing a printed matter printed making use of a double-sided printing system as claimed in claim 16, wherein the printing information further includes a size of the print paper and a double-sided printing form.

18. A method of distributing a printed matter printed making use of a double-sided printing system as claimed in claim 16, wherein said data management step synthesizes the data of the document files stored by the data storage step and transmits the synthesized data to the printing step.

* * * * *